Figure 1:
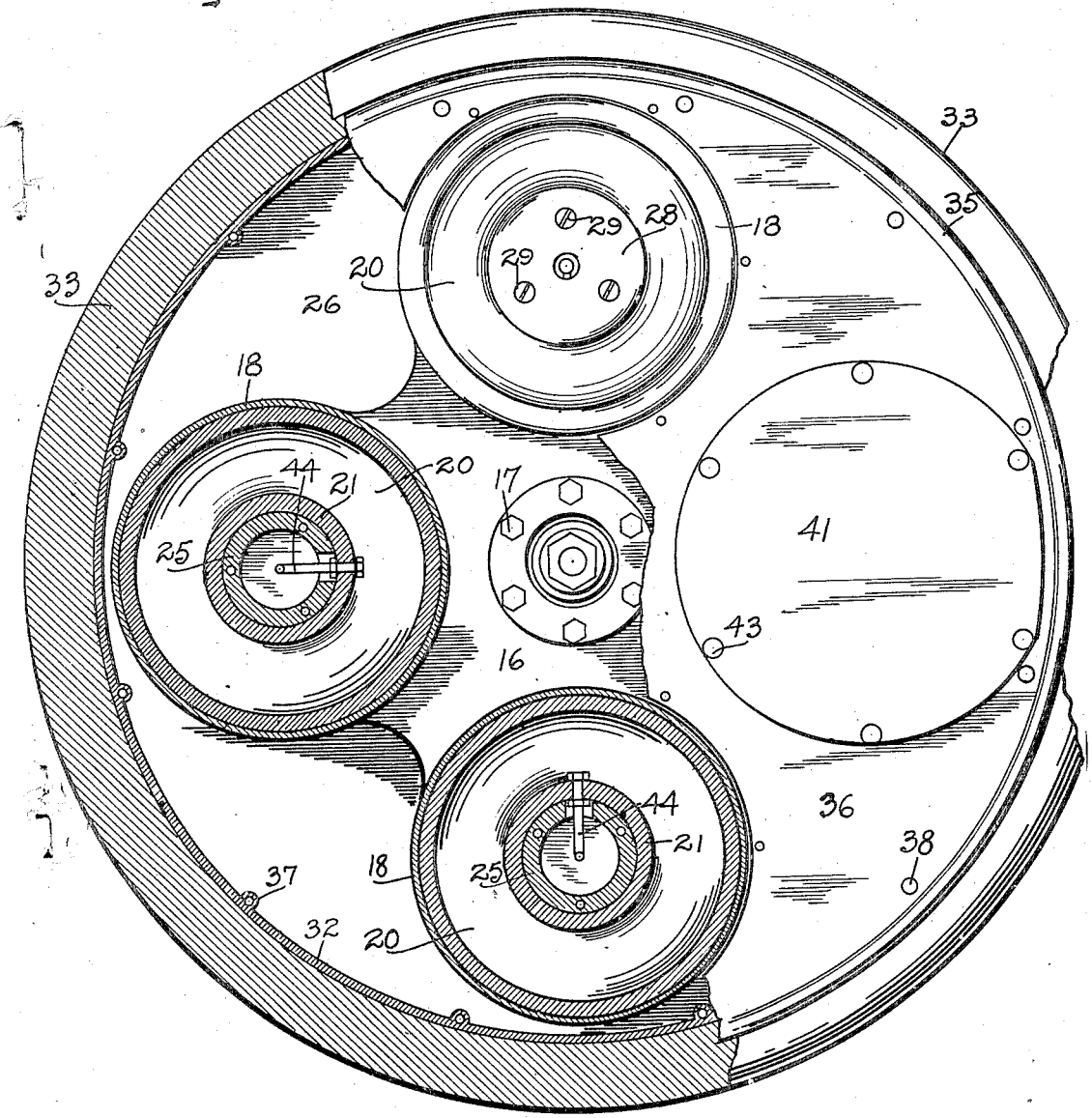

H. B. COATS.
VEHICLE WHEEL.
APPLICATION FILED NOV. 22, 1912.

1,180,011.

Patented Apr. 18, 1916.
2 SHEETS—SHEET 1.

Witnesses

Inventor
HENRY B. COATS.
By V. H. Lockwood
Attorney

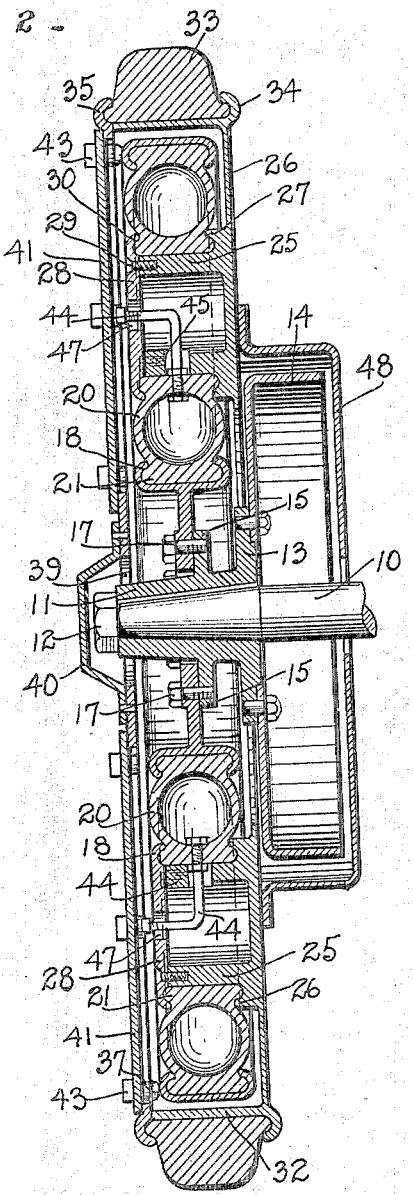

UNITED STATES PATENT OFFICE.

HENRY B. COATS, OF VEEDERSBURG, INDIANA.

VEHICLE-WHEEL.

1,180,011.  Specification of Letters Patent.  Patented Apr. 18, 1916.

Application filed November 22, 1912. Serial No. 732,959.

*To all whom it may concern:*

Be it known that I, HENRY B. COATS, a citizen of the United States, and a resident of Veedersburg, county of Fountain, and State of Indiana, have invented a certain new and useful Vehicle-Wheel; and I do hereby declare that the following is a full, clear, and exact description thereof, reference being had to the accompanying drawings, in which like letters refer to like parts.

The object of this invention is to provide an improved construction of vehicle wheel in which resilient means or pneumatic cushions or tubes are located between the axle and the tire of the wheel so as to take up the vibration of the wheel and protect the axle therefrom.

The chief feature of the invention consists in providing a plurality of annular pneumatic tubes or air cushions fixedly mounted in the casing of the wheel and adapted to support the axle which is arranged to float in the casing of the wheel and yet is so mounted in connection with the air cushions within the casing of the wheel that lateral displacement from said thrust will be prevented.

Furthermore, said invention consists in means for holding the air cushions in place and inflating them and rendering them accessible.

With this type of wheel a solid rubber tire may be used and thus all of the difficulties, annoyances and expense of pneumatic tires be avoided and yet the wheels be as resilient and shock absorbing as the best types of pneumatic tired wheels. The tread of the wheel may be made of any material or in any form desired.

The nature of the invention will be understood from the accompanying drawings and the following description and claims.

In the drawings, Figure 1 is a side elevation of a vehicle wheel with portions thereof in section parallel with the plane of the wheel. Fig. 2 is a central vertical section through the wheel shown in Fig. 1. Fig. 3 is a similar section through a modified form of wheel.

There is shown herein to illustrate the general nature of this invention, an axle 10 with a tapered end secured in a tapering hub-like member 11 by a nut 12. Said hub-like member has an inner radial flange 13 to which a brake drum 14 is secured. It also has a centrally located radial flange or arm 15 to which a plate 16 is secured by bolts 17. The plate 16 is formed in side elevation, as shown in Fig. 1, and is a web-like plate integrally connected with four annular clencher members 18 which are in cross section the shape of the ordinary clencher tire, only reversed, the flanges projecting radially inward instead of radially outward. There are four of these clencher members 18 arranged 90° apart, although the invention is not limited to any particular number. Within said annular clencher members 18, annular pneumatic cushions 20 are secured. On their outer peripheral surfaces the pneumatic cushions 20 are formed with beads 21 to fit tightly in the clencher member 18, much the same as the outer casing of an ordinary pneumatic tire fits in the clencher rim of a pneumatic tired wheel. Said pneumatic cushions are shaped on the inner peripheral surfaces the same as at the outer peripheries and fit on an inward and laterally extending tubular extension 25 from and integral with one side of the main frame or casing 26 of the wheel. At the side adjacent its connection with the casing of the wheel, said tubular extension is provided with an annular inwardly extending flange 27 which overlaps one of the inner beads of the pneumatic cushion. Otherwise the tubular member 25 is plain and on its other end a plate 28 is secured by screws 29 and this plate has a flange 30 for enveloping the other inner bead of the pneumatic cushion. In this manner the cushion is fixedly mounted in connection with the main casing or frame of the wheel.

The casing 26 has a central opening 31 larger than the hub so that the hub and axle will be enabled to float or move. There is an external tire rim 32 for a solid rubber tire 33 and there is a flange 34 at one side of the tire rim for engaging the bead of the tire and holding it in place. There is a flange 35 engaging the bead at the other side of the tire, which flange is an extension from a plate 36 which is removably secured to ears 37 on the tire rim 32 by bolts 38 and this plate 36 has a central opening 39 so that the hub 11 will float therein. This latter opening is closed by a removable cap 40. The side plate 36 of the wheel has an opening 41 opposite each pneumatic cushion 20 to render the latter accessible and said opening is closed by a circular plate 42 which is secured by nuts 43 to ears in said opening 41 extending from the plate 36.

The pneumatic cushions are inflated by applying an air pump through a tube 44 extending from each pneumatic cushion 20 through a slot 45 in the tubular extension 23. The tube 44 extends into the interior of the extension 25 radially and then is turned outwardly at a right angle and projects through a small opening 47 in the plate 28. Therefore, by removing one of the small plates 41, the air tube is accessible. There is also a casing 48 secured to the main frame 26 of the wheel and surrounding the brake drum 14 and spaced away from the axle 10 so as to permit relative movement of the wheel and axle.

From the foregoing it is seen that this wheel is resilient, absorbing the vibration or shock, whether coming from the variation of load acting upon the axle, or from variation in the roadway acting upon the wheel. The axle and its hub 11 and the plate 17 float in the wheel according to the yielding or resilience of the pneumatic cushions and said pneumatic cushions take up practically all of the vibration, excepting the vibration which may be taken up by the tire 33. In this connection it is also apparent that all four of the pneumatic cushions simultaneously and always coöperate in taking up the vibration or shock. The upper part of every cushion will be to some extent compressed, while the lower part of every cushion will be correspondingly stretched, and they will coöperate with each other. And since the cushions are stationary and contain compressed air, all parts of each cushion will receive corresponding stress, the strain being transmitted to all parts thereof by the air in the cushions. Hence, there is a very general distribution of strain and stress, not only to each cushion, but to all parts of the cushions. Consequently the wheel will be durable since the pneumatic cushions are wholly protected from puncture and from wear, there being no friction. The construction explained is such that the lateral expansion of the cushions is permitted without touching anything so that there is no wear to the sides of the cushions. Both their inner and outer peripheries are securely held in place by relatively fixed means. Consequently there is little opportunity for wear or injury to the cushions. Furthermore, if any cushion should be injured, the operation of the wheel would not materially be affected as the automobile could run with the remaining cushions without scarcely noticing any change. And a cushion which has been blown out can readily be replaced by removing the plates 41 and 28 and removing the old cushion and sliding in another. During this replacement, the cushion is collapsed and it readily comes out of the external holding member 18 and readily slides off of the tubular member 25. Another cushion is slipped in place while collapsed and after the plate 28 is replaced, the cushion is inflated. The slot 45 permits the cushion to be removed and replaced without interference with the air tube 44. It is thus seen that the wheel is very resilient and at the same time extremely durable, as there are no parts to wear excepting the solid rubber tire.

The modified form shown in Fig. 3 differs from that shown in Figs. 1 and 2 in only one or two particulars. In the first place instead of the extension 25 and plate 28 shown in Fig. 2, there is in the modified form in Fig. 3, two corresponding plates 50 which have the clencher rims on them and are clamped on the enlarged portion of a bolt 51 by nuts 52 which screw thereon and bear against the side plates 26 and 41 in which the reduced ends of the bolt 51 project. This construction enables the internal means on which each cushion is mounted, to be readily removable, if desired and yet said internal means is rigidly held in place while in use.

Another variation in the modified form shown in Fig. 3, is the air tube 144. It extends from the pneumatic cushion toward the hub and lies in the space surrounding the hub where it is accessible by removing the cap 40 at the end of the hub; and to enable the cushion to be removed or replaced with this tube in the same, the part 16 is slotted at 53, as shown in Fig. 3.

While the hub is referred to herein and in the claims as floating in the frame of the wheel, still is apparent from the description heretofore given, the annular means for externally holding the pneumatic cushions which are connected with the hub, likewise float in the wheel frame and, therefore, the series of cushions supports the load coming upon the axle of the hub. This arrangement requires a clearance between the external clenching members for the annular pneumatic cushions and the tire rim, substantially as shown, so that said floating members will have opportunity to move under changes of load or variations in roadway. With this arrangement, the annular cushions are enabled to extend practically from the hub to the tire rim and thus the cushions will be as close to the tire rim as they can be made without interfering with the tire rim during the vibrations of the wheel.

While there is shown herein a driving vehicle wheel to which power may be applied for propelling the vehicle, still the invention applies to front wheels and others which are not driven, and in the latter wheels the axle is not rigidly secured to the hub.

I claim as my invention:

1. A vehicle wheel including a chambered frame with a central opening and with a plurality of openings in one side thereof located between the center and periphery of said frame, a hub adapted to float in said central opening, a cylindrical inward extension from one side of the frame projecting toward each opening in the other side of the frame, an annular pneumatic cushion adapted to be slipped laterally over and be mounted on each of said extensions, a clenching member secured to the hub for surrounding and holding the external periphery of each pneumatic cushion, and a removable plate for closing the opening in the frame at the side of each pneumatic cushion.

2. A vehicle wheel including a chambered frame with a central opening therein and a plurality of openings in one side thereof between the center and circumference, a cylindrical extension from one side of said frame toward each opening in the other side lying between the center and circumference, each extension having a clenching flange on the inner end thereof, an annular pneumatic cushion having beads on the internal and external peripheries thereof and adapted to be slipped through the opening in the casing on and about each of said extensions, a removable plate secured to the outer end of each extension with a clenching flange thereon for engaging one of the inner beads of each cushion, and an external clenching member secured to the hub and surrounding each cushion and having flanges for clenching the external beads thereof.

3. A vehicle wheel including a chambered frame with a central opening with one side thereof provided with a plurality of openings between the center and circumference, removable plates for covering said openings, a hub adapted to float in the central opening of said frame, a cylindrical inward extension from the closed side of the frame projecting toward each of the openings between the center and circumference, an annular pneumatic cushion adapted to be inserted through each of said openings on and about each of said extensions, means secured to the outer ends of said extensions for holding the cushions thereon, an annular member secured to the hub and surrounding each cushion for holding the external periphery thereof, and a tube extending from each cushion into proximity of the opening in the frame thereof, whereby the cushions may be inflated or deflated.

4. A vehicle wheel including a chambered frame with a central opening and with a plurality of openings in one side thereof between the center and circumference, removable plates for covering said openings, a hub adapted to float in said central opening of the frame, a tubular extension from one side of said frame opposite each opening between the center and circumference with a clenching shoulder around the inner end thereof and with a longiudinal slot in one side thereof, an annular pneumatic cushion adapted to surround each of said extensions, a plate secured to the outer end of each extension for clenching the cushion and having a central opening therein, an air tube from the cushion extending through the slot in the extension and a hole in said plate for inflating and deflating the cushion while in the wheel, and an annular member surrounding each cushion and holding the external periphery thereof and secured to the hub.

In witness whereof, I have hereunto affixed my signature in the presence of the witnesses herein named.

HENRY B. COATS.

Witnesses:
  J. H. WELLS,
  O. M. McLAUGHLIN.